US006052463A

United States Patent [19]

Godais et al.

[11] Patent Number: 6,052,463

[45] Date of Patent: Apr. 18, 2000

[54] LOUDSPEAKER AND TELEPHONE DEVICE COMPRISING SUCH A LOUDSPEAKER

[75] Inventors: Marc Godais, Argentre; Daniel Badoual, Monce en Belin, both of France

[73] Assignee: U.S. Philips Corporation, New York, N.Y.

[21] Appl. No.: 09/030,483

[22] Filed: Feb. 25, 1998

[30] Foreign Application Priority Data

Feb. 25, 1997 [FR] France .................................. 97 02225

[51] Int. Cl.[7] ............................ H04M 1/00; H04R 25/00

[52] U.S. Cl. ............................................ 379/433; 381/386

[58] Field of Search .................................... 379/420, 428, 379/429, 433; 381/386, 392, 393, 394

[56] References Cited

U.S. PATENT DOCUMENTS 2,413,030 12/1946 McLarn .................................. 381/394

5,168,527 12/1992 Loya ...................................... 381/188

FOREIGN PATENT DOCUMENTS

0336859A1 10/1989 France .

0755165A1 1/1997 Germany .

0403206A2 12/1990 United Kingdom .

*Primary Examiner*—Jack Chiang

*Attorney, Agent, or Firm*—Dicran Halajian

[57] ABSTRACT

The invention relates to a loudspeaker whose electrical contacts (30*a*, 30*b*) for connecting to the coupled electronic circuits are plates that can be bent. To prevent the crushing of these contacts while a board is joined to the loudspeaker, or in case of accidental fall, one or various stops (40*a*, 40*b*) firmly attached to the frame (10) of the loudspeaker are provided and restrict the deformation of the plates.

5 Claims, 1 Drawing Sheet

LOUDSPEAKER AND TELEPHONE DEVICE COMPRISING SUCH A LOUDSPEAKER

FIELD OF THE INVENTION

The present invention relates to a loudspeaker comprising a frame on which is fixed, on the one hand, an electroacoustic transducer membrane and, on the other hand, two contacts for the electrical connection of the loudspeaker. The invention likewise relates to any equipment comprising at least one loudspeaker connected to electronic circuits realized on a printed circuit board, and, for example, a telephony device notably comprising in a housing a loudspeaker connected to a printed circuit board, said loudspeaker comprising a frame on which is fixed, on one side, an electroacoustic transducer membrane and, on the other side, two contacts for the electrical connection of the loudspeaker and said board.

BACKGROUND OF THE INVENTION

The coupling of a loudspeaker and a printed circuit board to which it is connected by electrical contacts is provided in many pieces of equipment, such as car radios or telephones. U.S. Pat. No. 5,168,527 describes such a structure: a loudspeaker electrically connected to a printed circuit board is fixed to this board by one or various lugs used for precisely centering the loudspeaker and for maintaining the loudspeaker at a proper distance from the board. A structure of this type, however, is only adapted to the situation in which the connections with the board are realized with the aid of conductive wires rigidly soldered on the board or any other equivalent means, and in which the loudspeaker itself is centered and fixedly soldered on the board or any other equivalent means, and where the loudspeaker itself is centered and immobilized relative to the board at a distance that can be adjusted depending on the notches used on the lugs.

SUMMARY OF THE INVENTION

A first object of the invention is to propose another type of loudspeaker that corresponds to another mode of assembly and electrical connection relative to the printed circuit board.

For this purpose, the invention relates to a loudspeaker as defined in the opening paragraph of the description and which is further characterized in that the two electrical contacts are deformable conductive plates to which is coupled on the frame of the loudspeaker at least one stop for limiting the deformation of said plates, positioned near to said plates.

It is another object of the invention to propose the use of this structure in a telephony device.

For this purpose, the invention relates to a telephony device, characterized in that the two contacts of the loudspeaker are deformable conductive plates intended to come into contact with corresponding connections of the board and to which is coupled on the frame of the loudspeaker at least one stop for limiting the deformation of said plates. Preferably, two stops are provided and are thus advantageously positioned on either one of the two sides of the two electrical contacts.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
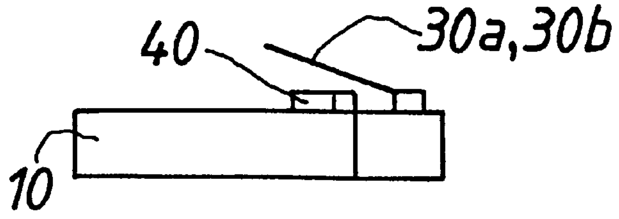
FIGS. 1 and 2 show an embodiment of the invention in a side and front view, respectively.
Figure 2:
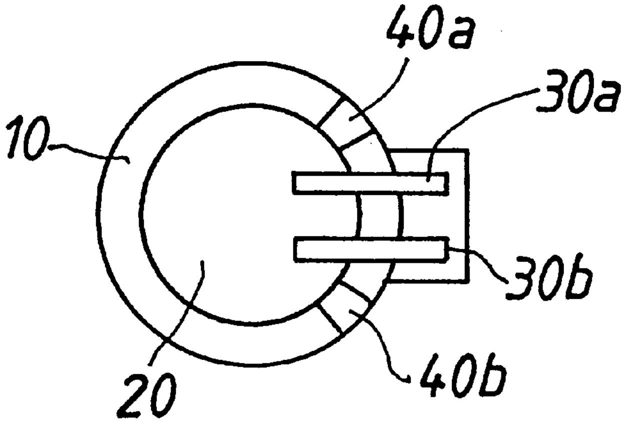

The loudspeaker shown in a highly diagrammatic manner in a side view in FIG. 1 and in a front view in FIG. 2 comprises a frame 10 carrying, on the one hand, on one side, an electroacoustic transducer membrane 20 and, on the other hand, on the other side, two electrical contacts 30*a* and 30*b*. These two contacts are in the present case two deformable conductive plates forming a spring intended to allow of the electrical connection of the loudspeaker.

At least one stop 40, firmly attached to the frame (that is to say, forming only a single part with the frame during manufacture) is coupled to these contacts, oriented on the side of the contacts, and situated close to them. Via at least one stop, one has to understand that this stop is sufficient for obtaining the desired technical effect which is limiting the course of the contacts when they are depressed in order to refrain them from being crushed either during manufacture or even during an accidental fall. It will be noted, however, that a preferred embodiment of the invention includes two stops 40*a* and 40*b* and preferably positioned on either one of the two sides of the two contacts (but a larger number of stops would be possible).

Figure 3:
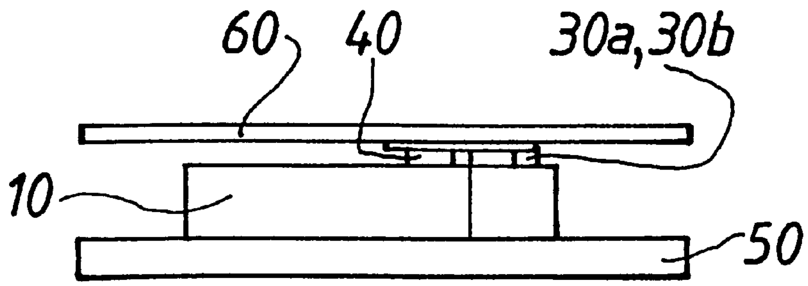
FIG. 3 shows an example of how the invention can be used in a telephony device.

FIG. 3 illustrates an example of the use of the invention in a telephony device. Such a device (not shown in all its elements) notably comprises a housing 50 of electrically insulating material, intended to contain all the mechanical and electrical elements of the device. Only a fraction of this housing is represented in FIG. 3, the fraction that is intended to receive the loudspeaker of the device. The membrane 20 is turned to the outside of the housing 50 and thus of the device, whereas the loudspeaker face that carries the contacts 30*a* and 30*b* is turned to the inside of the device. When the elements of the device are mounted, a printed circuit board 60 carrying the electronic circuits to which the loudspeaker is to be connected is applied against the corresponding face of the loudspeaker for establishing the electrical connection between said electronic circuits (carried by the board) and the contacts 30*a* and 30*b* (carried by the loudspeaker). Thanks to the stops 40*a* and 40*b* which are present on the frame of the loudspeaker, the deformation of the deformable plates which form the contacts 30*a* and 30*b* is limited, that is to say, that the height of the stops is calculated so that this deformation remains within the limits of the elastic deformation of said plates, without the plates being crashed which could occur if there were no stops. These stops, which can be manufactured in one piece together with the frame of the loudspeaker permit as it were to adjust the effect of pressure, voluntary or accidental, on the electrical contacts.

What is claimed is:

1. A loudspeaker comprising:

a frame which supports said loudspeaker;

an electroacoustic transducer membrane;

deformable conductive plates for electrical connection of said loudspeaker, said deformable conductive plates having one end attached to said frame; and a plurality of stops protruding from a portion of said frame for limiting deformation of said deformable conductive plates.

2. The loudspeaker of claim 1, wherein said plurality of stops are at a same level as said deformable conductive plates when said deformable conductive plates contact a printed circuit board.

3. The loudspeaker of claim 1, wherein said plurality of stops are located adjacent to said deformable conductive plates so that said deformable conductive plates do not contact said plurality of stops when deformed.

4. A telephone comprising:

a housing;

a loudspeaker having a frame with a first side and a second side, said first side being opposite said second side and said first side contacting said housing, said frame having an electroacoustic transducer membrane located on said first side and deformable conductive plates attached to said second side; and a printed circuit board located on said second side of said frame so that said deformable conductive plates provide electrical connection of said loudspeaker to said printed circuit board; and a stop protruding from a portion of said second side for limiting deformation of said deformable conductive plates.

5. The telephone of claim 4, further comprising another stop, wherein said stop and said another stop are at a same level as said deformable conductive plates when said deformable conductive plates contact said printed circuit board.

* * * * *